(12) United States Patent
Nakayama et al.

(10) Patent No.: US 12,049,214 B2
(45) Date of Patent: Jul. 30, 2024

(54) BRAKING CONTROL APPARATUS

(71) Applicant: SUBARU CORPORATION, Tokyo (JP)

(72) Inventors: Daisuke Nakayama, Tokyo (JP); Yutaro Kubo, Tokyo (JP); Kazuki Nabekura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 351 days.

(21) Appl. No.: 17/511,131

(22) Filed: Oct. 26, 2021

(65) Prior Publication Data

US 2022/0153244 A1 May 19, 2022

(30) Foreign Application Priority Data

Nov. 13, 2020 (JP) .................................. 2020-189168

(51) Int. Cl.
*B60T 8/1755* (2006.01)
*B60R 21/0132* (2006.01)
*B60T 7/22* (2006.01)
*B60R 21/01* (2006.01)

(52) U.S. Cl.
CPC ...... *B60T 8/17558* (2013.01); *B60R 21/0132* (2013.01); *B60T 7/22* (2013.01); *B60R 2021/01259* (2013.01); *B60R 2021/01327* (2013.01); *B60T 2201/024* (2013.01)

(58) Field of Classification Search
CPC ................ B60T 2201/024; B60R 2021/01327
See application file for complete search history.

(56) References Cited

U.S. PATENT DOCUMENTS

| 2011/0264348 | A1 | 10/2011 | Cetinkaya et al. | |
| 2015/0166058 | A1* | 6/2015 | Mizutani ................ | B60K 35/00 701/1 |
| 2016/0090041 | A1* | 3/2016 | Nagasawa ............ | G06V 20/588 345/7 |

(Continued)

FOREIGN PATENT DOCUMENTS

| JP | 2012-505117 A | 3/2012 |
| JP | 2013-119346 A | 6/2013 |

(Continued)

OTHER PUBLICATIONS

Notice of Reasons for Refusal received in corresponding Japanese Patent Application No. 2020-189168 on Mar. 12, 2024.

*Primary Examiner* — Melody M Burch
(74) *Attorney, Agent, or Firm* — Rimon P.C.

(57) ABSTRACT

A braking control apparatus is configured to control braking force to be generated by a braking device of a vehicle. The braking control apparatus includes a contact detector and a braking control unit. The contact detector is configured to detect a contact of the vehicle. The braking control unit is configured to perform a post-crash braking control that generates the braking force in response to that the contact detector detects the contact and thereby decelerates the vehicle, and cancel the post-crash braking control in a case where an amount of operation of an accelerator operation device of the vehicle is increased and decreased in a predetermined pattern, in which the accelerator operation device is configured to receive an accelerator operation to be performed by a driver who drives the vehicle.

2 Claims, 2 Drawing Sheets

(56) References Cited

U.S. PATENT DOCUMENTS

2016/0375899 A1 12/2016 Takenaka
2017/0341612 A1 11/2017 Omori et al.

FOREIGN PATENT DOCUMENTS

| JP | 2015-140088 A | 8/2015 |
| JP | 2016-040142 A | 3/2016 |
| JP | 2016-101891 A | 6/2016 |
| KR | 101939441 B1 * | 1/2019 |

* cited by examiner

BRAKING CONTROL APPARATUS

CROSS-REFERENCE TO RELATED APPLICATIONS

The present application claims priority from Japanese Patent Application No. 2020-189168 filed on Nov. 13, 2020, the entire contents of which are hereby incorporated by reference.

BACKGROUND

The technology relates to a braking control apparatus to be provided on a vehicle and adapted to perform braking automatically upon a collision.

A vehicle such as an automobile may perform a post-crash braking control that decelerates an own vehicle automatically within a traveling lane of the own vehicle so as to prevent, for example, an occurrence of a secondary collision in which the own vehicle involves a surrounding vehicle after a collision of the own vehicle with an object such as another vehicle.

For example, Japanese Unexamined Patent Application Publication (JP-A) No. 2012-505117 discloses a technique related to the post-crash braking control in which braking force is formed automatically upon a collision. JP-A No. 2012-505117 teaches that the automatic formation of the braking force is cut off in a case where an operation of a traveling pedal is kept at a predetermined strength for a predetermined period of time, and that factors including a gradient and a maximum level of the operation of the traveling pedal are taken into consideration.

JP-A No. 2013-119346 compares an operation state of a brake pedal and an operation state of an accelerator pedal during automatic braking and those after a stop of a vehicle that performs the automatic braking upon an emergency to determine whether to release or continue the automatic braking after the stop of the vehicle.

JP-A No. 2015-140088 discloses a vehicle control apparatus that performs an automatic braking control upon expansion of an in-vehicle airbag after a collision. JP-A No. 2015-140088 teaches that the automatic braking control is not cancelled even in a case where an accelerator operation is detected within a first predetermined period of time during the automatic braking control, and that the automatic braking control is cancelled even in a case where the accelerator operation is not detected if the time exceeds a second predetermined period of time that is longer than the first predetermined period of time.

SUMMARY

An aspect of the technology provides a braking control apparatus configured to control braking force to be generated by a braking device of a vehicle. The braking control apparatus includes a contact detector and a braking control unit. The contact detector is configured to detect a contact of the vehicle. The braking control unit is configured to perform a post-crash braking control that generates the braking force in response that the contact detector detects the contact and thereby decelerates the vehicle, and cancel the post-crash braking control in a case where an amount of operation of an accelerator operation device of the vehicle is increased and decreased in a predetermined pattern, in which the accelerator operation device is configured to receive an accelerator operation to be performed by a driver who drives the vehicle.

An aspect of the technology provides a braking control apparatus that includes circuitry and a contact detector. The circuitry is configured to control braking force to be generated by a braking device of a vehicle. The contact detector is configured to detect a contact of the vehicle. The circuitry is configured to perform a post-crash braking control that generates the braking force in response to that the contact detector detects the contact and thereby decelerates the vehicle, and cancel the post-crash braking control in a case where an amount of operation of an accelerator operation device of the vehicle is increased and decreased in a predetermined pattern, in which the accelerator operation device is configured to receive an accelerator operation to be performed by a driver who drives the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
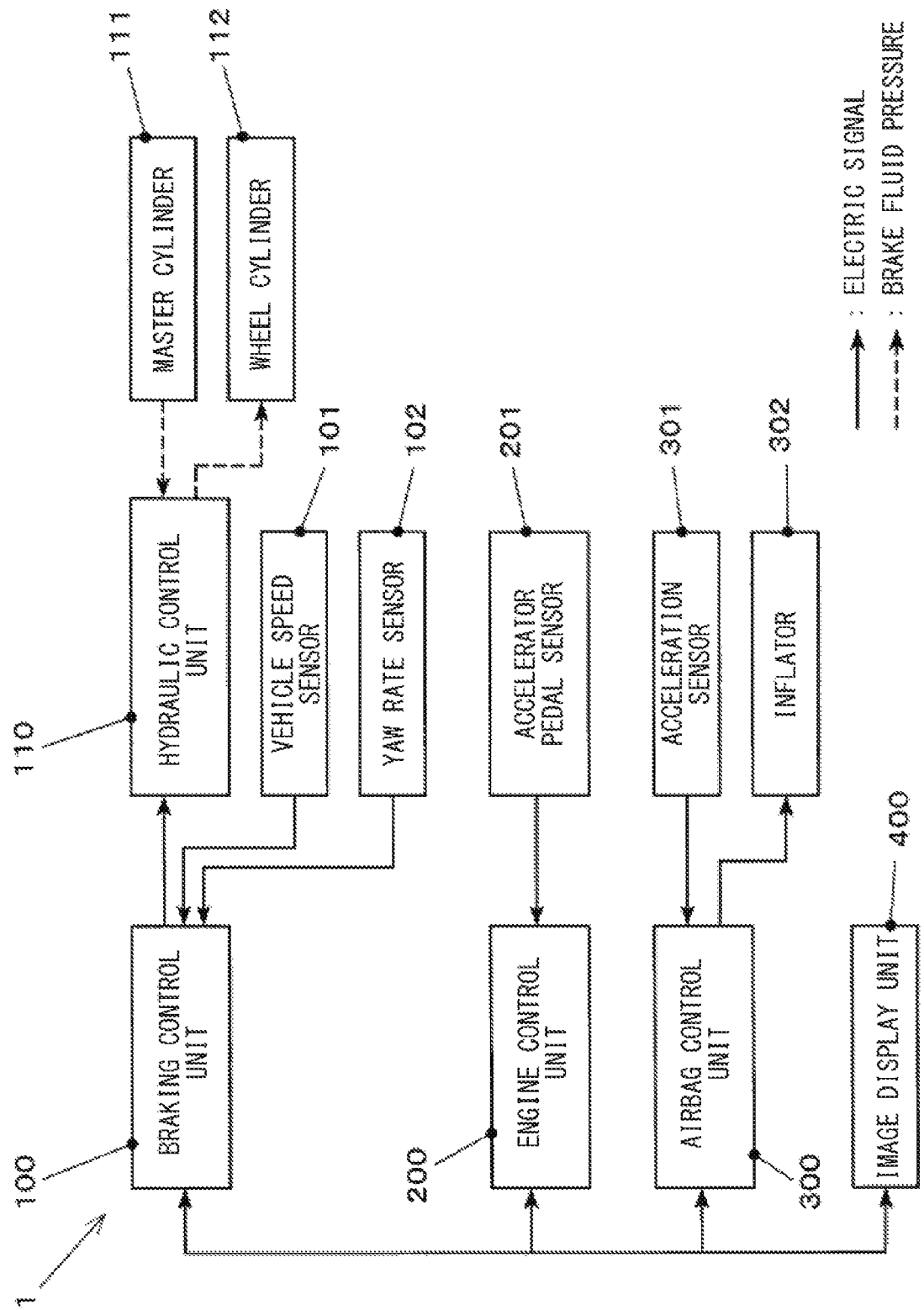
FIG. 1 is a block diagram schematically illustrating an example of a system configuration of a vehicle that includes a braking control apparatus according to one embodiment of the technology.

A post-crash braking control may be cancelled in response to an accelerator operation performed by a driver.

However, the driver can unintentionally press an accelerator pedal due to, for example, abrupt deceleration caused by a collision impact upon an occurrence of a collision. In this case, the post-crash braking control can be cancelled in response to the accelerator operation against the driver's intention.

It is desirable to provide a braking control apparatus that makes it possible for a driver to cancel a post-crash braking control at his/her own discretion and that makes it possible to prevent the post-crash braking control from being cancelled against the driver's intention.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

The braking control apparatus according to an example embodiment of the technology may be configured to be mounted on a vehicle such as an automobile, including a passenger car.

The braking control apparatus according to an example embodiment performs a post-crash braking control. The post-crash braking control may execute braking automatically and thereby decelerates or stops an own vehicle in a case where the own vehicle collides with an object such as another vehicle.

FIG. 1 is a block diagram schematically illustrating an example of a system configuration of a vehicle 1 that includes the braking control apparatus according to an example embodiment of the technology.

The vehicle 1 includes a braking control unit 100. The vehicle 1 may also include devices including, for example, a hydraulic control unit 110, an engine control unit 200, and an airbag control unit 300.

The braking control unit 100, the hydraulic control unit 110, the engine control unit 200, and the airbag control unit 300 each may be or include a microcomputer having devices including, for example, a data processor, a storage, an input/output interface, and a bus. The data processor may be a central processing unit (CPU). The storage may be any memory such as a random-access memory (RAM) or a read-only memory (ROM). The bus may couple the data processor, the storage, and the input/output interface together.

The braking control unit 100, the hydraulic control unit 110, the engine control unit 200, and the airbag control unit 300 each may transmit various pieces of data via an in-vehicle local area network (LAN) such as a controller area network (CAN) communication system, or each may communicate directly with each other to transmit the various pieces of data.

The braking control unit 100 controls braking force to be generated by an unillustrated fluid-pressure-based service brake that is provided for each wheel of the vehicle 1. In one embodiment, the service brake may serve as a "braking device".

The braking control unit 100 may give a command to the hydraulic control unit 110 to individually control a brake fluid pressure of a wheel cylinder 112 of each wheel and thereby to generate the braking force to the service brake of each wheel.

The braking control unit 100 may be coupled to devices including, for example, a vehicle speed sensor 101 and a yaw rate sensor 102.

The vehicle speed sensor 101 may detect a rotation speed, or a wheel speed, of a corresponding wheel.

The yaw rate sensor 102 may detect a yaw rate. The yaw rate may be a rotation speed around a vertical axis of a vehicle body of the vehicle 1.

An output of the vehicle speed sensor 101 and an output of the yaw rate sensor 102 may be used for controls including, for example, an anti-lock braking control and a vehicle behavior control to be described below.

The braking control unit 100 may perform the anti-lock braking control that recovers a rotation of a wheel by decreasing the brake fluid pressure of the corresponding wheel when a wheel lock is occurred upon braking. The braking control unit 100 may perform, upon an occurrence of an understeer behavior or an oversteer behavior, the vehicle behavior control that generates a difference in braking force between right and left wheels to generate a yaw moment in a direction of suppressing the behavior.

The braking control unit 100 also performs the post-crash braking control that generates the braking force automatically and thereby decelerates or stops the vehicle 1, upon an occurrence of a collision that involves not less than a predetermined impact (or acceleration) on the vehicle 1.

It should be noted that the post-crash braking control according to an example embodiment will be described later in greater detail.

The hydraulic control unit 110 may individually adjust the brake fluid pressure of the wheel cylinder 112 of each wheel.

The hydraulic control unit 110 may include an electric pump that increases a pressure of a brake fluid. The hydraulic control unit 110 may also include valves that control the brake fluid pressure of each wheel cylinder 112, including, for example, a pressure-increasing valve, a pressure-decreasing valve, and a pressure holding valve.

The hydraulic control unit 110 may be coupled, via a brake fluid piping, to devices including, for example, a master cylinder 111 and a wheel cylinder 112.

The master cylinder 111 may increase the pressure of the brake fluid in response to an operation of an unillustrated brake pedal performed by a driver.

The brake fluid pressure generated by the master cylinder 111 may be configured to be transmitted to the wheel cylinder 112 through the hydraulic control unit 110.

The hydraulic control unit 110 may perform an override of the brake fluid pressure generated by the master cylinder 111 to increase or decrease the brake fluid pressure of each wheel cylinder 112.

The wheel cylinder 112 may be provided for each wheel, and may generate friction force, or the braking force, that corresponds to the brake fluid pressure. For example, the wheel cylinder 112 may have a disc rotor and a brake pad to be pressed against the disc rotor.

The engine control unit 200 may control an engine and its accessories integrally. The engine may be mounted on the vehicle 1 as a traveling drive source.

The engine control unit 200 may be coupled to an accelerator pedal sensor 201.

The accelerator pedal sensor 201 may include a position encoder that detects an amount of operation, or an amount of pressing, of an unillustrated accelerator pedal that receives an input of an accelerator operation performed by the driver. In one embodiment, the accelerator pedal may serve as an "accelerator operation device".

The engine control unit 200 may sense, on the basis of an output of the accelerator pedal sensor 201, the amount of operation, or an accelerator position, of the accelerator pedal on a percentage basis. For example, the engine control unit 200 may sense the amount of operation of the accelerator pedal on the percentage basis, where the amount of operation upon non-operation, i.e., the driver has released his/her foot from the accelerator pedal, is defined as 0%, and where the amount of operation when the accelerator pedal is fully pressed is defined as 100%.

The engine control unit 200 may set a torque requested by the driver on the basis of the accelerator position, and may so adjust an output of the engine as to bring a torque actually generated by the engine to be coincident with the torque requested by the driver.

The airbag control unit 300 may control expansion and inflation of an airbag. The airbag may be provided in a vehicle compartment of the vehicle 1, and may restrain an occupant upon the collision.

For example, the airbag may have a base fabric that includes nylon fibers, and may be configured to be formed into a bag shape. The airbag may expand and inflate as a result of introduction of an expansion gas upon the collision to restrain, for example, the occupant.

The airbag control unit 300 may be coupled to devices including, for example, an acceleration sensor 301 and an inflator 302.

The acceleration sensor 301 may be provided at each of multiple locations of the vehicle body. The acceleration sensor 301 detects a collision of the vehicle 1. For example, the acceleration sensor 301 may detect acceleration that acts on the vehicle body upon the collision. In one embodiment, the acceleration sensor 301 may serve as a "collision detector" or a "contact detector".

The inflator 302 may be a gas generator that supplies the expansion gas to each airbag provided in the vehicle 1, in response to a command given from the airbag control unit 300.

The vehicle 1 may include an image display unit 400.

The image display unit 400 may be so provided, for example, on an interior member of the vehicle 1 as to allow the occupant, such as the driver, to see the image display unit 400. For example, the interior member may be an instrument panel.

The image display unit 400 may include any display such as a liquid crystal display (LCD) or an organic electroluminescence display. The image display unit 400 may display information including, for example, an image and a text.

A description is given hereinafter of an operation upon the post-crash braking control of the braking control apparatus according to an example embodiment.

Figure 2:
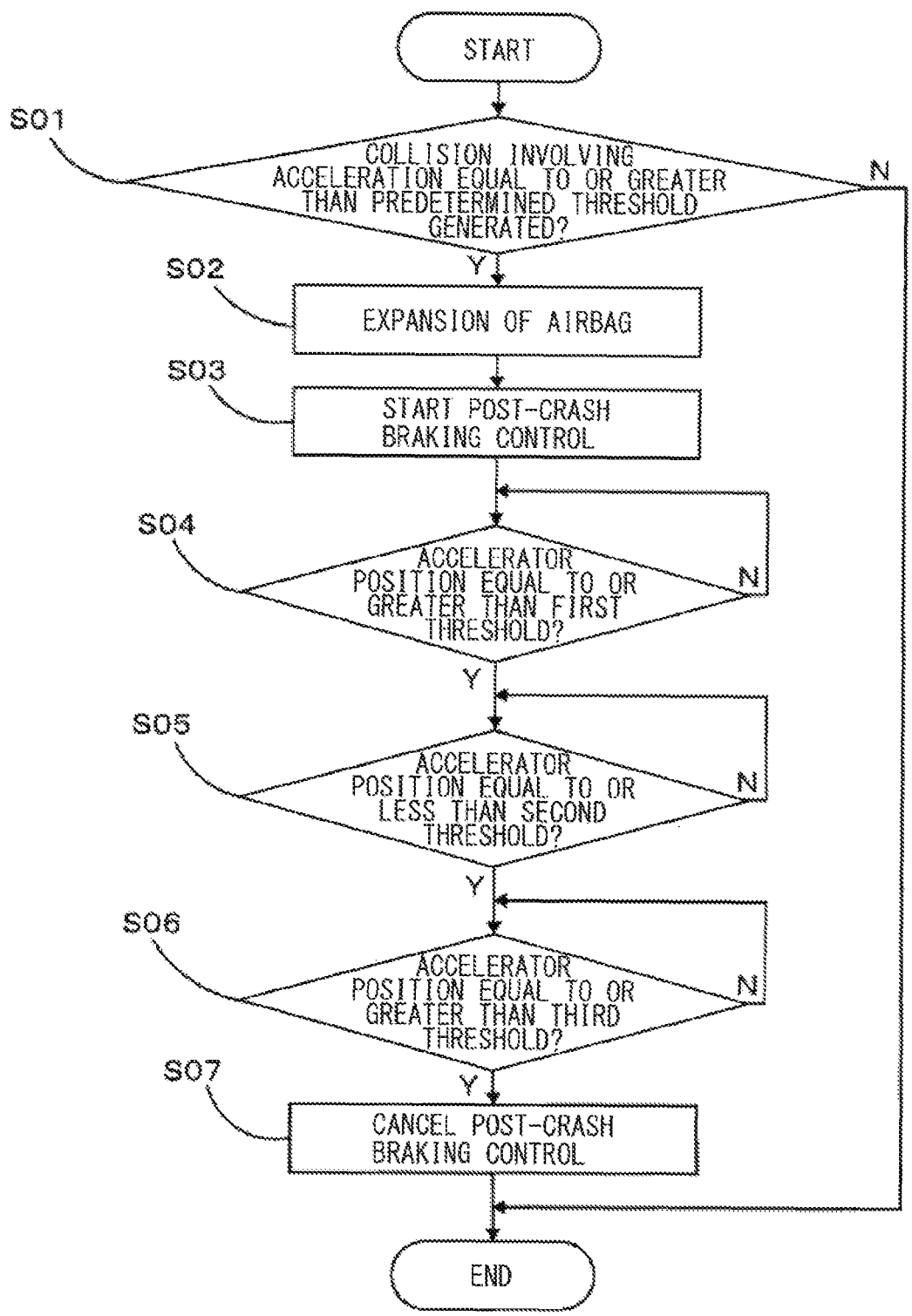
FIG. 2 is a flowchart illustrating an example of an operation of the braking control apparatus according to one example embodiment.

FIG. 2 is a flowchart illustrating an example of an operation of the braking control apparatus according to an example embodiment.

Hereinafter, each step will be described in order.

[Step S01: Determination of Occurrence of Collision]

The airbag control unit 300 may determine whether a collision that involves acceleration that is equal to or greater than a predetermined threshold is generated, on the basis of the output of the acceleration sensor 301.

The threshold may be set in consideration of the acceleration to be generated upon the collision at a level that requires the expansion and the inflation of the airbag.

If the airbag control unit 300 determines that the collision that involves the acceleration equal to or greater than the threshold is generated (step S01: Y), the operation may proceed to step S02. Otherwise, a series of processes may end or may be returned (step S01: N).

[Step S02: Expansion of Airbag]

The airbag control unit 300 may give the command to the inflator 302 provided at the airbag to cause the inflator 302 to generate the expansion gas and thereby to expand and inflate the airbag.

Thereafter, the operation may proceed to step S03.

[Step S03: Start of Post-Crash Braking Control]

The braking control unit 100 may start the post-crash braking control. For example, as the post-crash braking control, the braking control unit 100 may give the command to the hydraulic control unit 110 to cause the hydraulic control unit 110 to supply the brake fluid pressure to the wheel cylinder 112 of each wheel and thereby to generate the braking force. This may in turn cause the vehicle 1 to decelerate at predetermined deceleration and may eventually cause the vehicle 1 to stop.

Optionally, the post-crash braking control may be executed in addition to, for example, any lane departure prevention control and/or any vehicle behavior control. The lane departure prevention control may prevent a departure of the vehicle 1 from a lane along which the vehicle 1 travels. The vehicle behavior control may suppress the understeer behavior and/or the oversteer behavior.

Optionally, the image display unit 400 may display information indicating that the post-crash braking control is started.

Thereafter, the operation may proceed to step S04.

[Step S04: Determination of First Threshold of Accelerator Position]

The braking control unit 100 may acquire data on the amount of operation of the accelerator pedal from the engine control unit 200, and may compare the current accelerator position with a preset first threshold. For example, the braking control unit 100 may acquire data on the accelerator position from the engine control unit 200 to compare the current accelerator position with the first threshold.

If the braking control unit 100 determines that the accelerator position is equal to or greater than the first threshold (step S04: Y), the operation may proceed to step S05 on the premise that an operation of pressing the accelerator pedal is carried out. Otherwise, step S04 may be repeated (step S04: N).

[Step S05: Determination of Second Threshold of Accelerator Position]

The braking control unit 100 may compare the current accelerator position with a preset second threshold that is less than the first threshold.

If the braking control unit 100 determines that the accelerator position is equal to or less than the second threshold (step S05: Y), the operation may proceed to step S06 on the premise that an operation of returning the accelerator pedal is carried out. Otherwise, step S05 may be repeated (step S05: N).

[Step S06: Determination of Third Threshold of Accelerator Position]

The braking control unit 100 may compare the current accelerator position with a preset third threshold that is greater than the second threshold. In some embodiments, the third threshold may be the same in value as the first threshold.

If the braking control unit 100 determines that the accelerator position is equal to or greater than the third threshold (step S06: Y), the operation may proceed to step S07 on the premise that the operation of pressing the accelerator pedal is carried out again. Otherwise, step S06 may be repeated (step S06: N).

[Step S07: Cancellation of Post-Crash Braking Control]

If the accelerator position is increased and decreased in a predetermined pattern, e.g., if results of the comparison performed in steps S04, S05, and S06 are all determined as being YES, the braking control unit 100 may cancel the post-crash braking control. Further, the braking control unit 100 may cause the control of the braking force of the service brake to be returned to a control performed in a normal state.

Thus, the braking force generated as a result of the post-crash braking control may be released.

Optionally, the image display unit 400 may display information indicating that the post-crash braking control is ended.

Thereafter, a series of processes may be ended.

The foregoing example embodiment makes it possible to achieve at least one of the following example effects.

(1) For instance, the post-crash braking control is cancelled in a case where the accelerator position as an example of the operation amount of the accelerator pedal is increased and decreased in a predetermined pattern, e.g., in a pattern of pressing, returning, and pressing. Thus, it is possible to prevent the post-crash braking control from being cancelled by the accelerator operation unintended by the driver due to an impact, and to effectively reduce a secondary damage.

Further, operating the accelerator operation device on the basis of the predetermined pattern makes it possible to cancel the post-crash braking control at the driver's discretion in a case where the driver wishes to cancel the post-crash braking control positively. This in turn makes it possible to move the vehicle to a safe location, for example.

(2) For instance, the post-crash braking control may be cancelled in a case where the accelerator position makes the transition sequentially from the satisfaction of the condition in which the accelerator position is equal to or greater than the first threshold, through the satisfaction of the condition in which the accelerator position is equal to or less than the second threshold, to the satisfaction of the condition in which the accelerator position is equal to or greater than the third threshold. Thus, it is possible to achieve the example effects described above appropriately by a simple logic based only on the accelerator position.

It should be appreciated that operating the accelerator operation device a plurality of times is based on an action that the driver naturally takes when intentionally starting or accelerating the vehicle. Thus, it is possible to cancel the post-crash braking control faithfully to the driver's intention.

MODIFICATION EXAMPLES

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

(1) For instance, a configuration of the braking control apparatus and/or a configuration of the vehicle may be variously modified as necessary without being limited to the configurations described in the above example embodiment.

For example, the braking force is generated on the basis of the fluid-pressure-based service brake in the post-crash braking control according to an example embodiment. In some embodiments, the braking force may be generated on the basis of a regenerative brake that uses a motor generator. In some embodiments, the braking force may be generated on the basis of an electric brake that allows for dynamic breaking, such as an electric parking brake.

In some embodiments, a plurality of brakes, such as those described above, may be controlled collaboratively.

For example, the thresholds of the operation amount of the accelerator operation device are exemplary and may be modified as necessary.

(2) For instance, the transition pattern of the amount of operation of the accelerator operation device by which the post-crash braking control is cancelled is not limited to the pattern described in the above example embodiment and may be modified as necessary.

For example, the post-crash braking control may be cancelled by returning the accelerator pedal once and pressing the accelerator pedal for the second time in the example embodiment described above. In some embodiments, the post-crash braking control may be cancelled by performing the operations, including returning the accelerator pedal and pressing the accelerator pedal, three or more times.

For example, the cancellation of the post-crash braking control may be determined only on the basis of the accelerator position in the example embodiment described above. In some embodiments, a speed of the operation of the accelerator operation device may be taken into consideration alternatively or in addition to the accelerator position. In some embodiments, the post-crash braking control may be cancelled in a case where the speed of the operation of the accelerator operation device increases at a speed equal to or greater than a predetermined speed upon the increase in the accelerator position.

According to at least one embodiment of the technology, it is possible to provide a braking control apparatus that makes it possible for a driver to cancel the post-crash braking control at his/her own discretion and that makes it possible to prevent the post-crash braking control from being cancelled against the driver's intention.

As used herein, the term "collision" may be used interchangeably with the term "contact".

The braking control unit 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the braking control unit 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the braking control unit 100 illustrated in FIG. 1.

The invention claimed is:

1. A braking control apparatus for a vehicle, the braking control apparatus comprising:
 a contact detector configured to detect a contact between the vehicle and an object; and
 a braking control unit configured to perform a post-crash braking control by controlling a braking device of the vehicle to generate braking force in response to the contact detector detecting the contact,
 wherein, while the post-crash braking control is being performed, the braking control unit is further configured to:
 determine whether an amount of operation of an accelerator operation device of the vehicle becomes equal to or greater than a first threshold;
 in response to determining that the amount of operation of the accelerator operation device becomes equal to or greater than the first threshold, determine whether the amount of operation of the accelerator operation device becomes equal to or less than a second threshold that is less than the first threshold;
 in response to determining that the amount of operation of the accelerator operation device becomes equal to or less than the second threshold, determine whether the amount of operation of the accelerator operation device becomes equal to or greater than a third threshold that is greater than the second threshold, and in response to determining that the amount of operation of the accelerator operation device becomes equal to or greater than the third threshold, cancel the post-crash braking control.

2. A braking control apparatus for a vehicle, the braking control apparatus comprising:

a contact detector configured to detect a contact between the vehicle and an object; and circuitry configured to perform a post-crash braking control by controlling a braking device of the vehicle to generate braking force in response to the contact detector detecting the contact, wherein, while the post-crash braking control is being performed, the circuitry is further configured to:

determine whether an amount of operation of an accelerator operation device of the vehicle becomes equal to or greater than a first threshold;

in response to determining that the amount of operation of the accelerator operation device becomes equal to or greater than the first threshold, determine whether the amount of operation of the accelerator operation device becomes equal to or less than a second threshold that is less than the first threshold;

in response to determining that the amount of operation of the accelerator operation device becomes equal to or less than the second threshold, determine whether the amount of operation of the accelerator operation device becomes equal to or greater than a third threshold that is greater than the second threshold, and in response to determining that the amount of operation of the accelerator operation device becomes equal to or greater than the third threshold, cancel the post-crash braking control.

* * * * *